United States Patent [19]

Centofanti

[11] 4,305,337
[45] Dec. 15, 1981

[54] SEEDLING PLANTER

[76] Inventor: Armando P. Centofanti, 2812 Newbern Cir., Youngstown, Ohio 44502

[21] Appl. No.: 165,348

[22] Filed: Jul. 2, 1980

[51] Int. Cl.³ .............................................. A01C 11/00
[52] U.S. Cl. ....................................................... 111/3
[58] Field of Search ....................................... 111/2-7, 111/76, 99

[56] References Cited

U.S. PATENT DOCUMENTS

| 699,247 | 5/1902 | Sanford | 111/76 |
| 1,517,715 | 12/1924 | De Geus | 111/3 X |
| 1,657,944 | 1/1928 | Stocker et al. | 111/3 |
| 1,878,412 | 9/1932 | Lamiell | 111/3 |
| 2,776,633 | 1/1957 | Bible | 111/2 |
| 3,902,437 | 9/1975 | Vander Lely et al. | 111/2 |
| 3,998,171 | 12/1976 | Lofgren et al. | 111/2 |
| 4,060,043 | 11/1977 | Lofgren | 111/3 |

FOREIGN PATENT DOCUMENTS

| 40651 | 8/1921 | Denmark | III/3 |
| 653620 | 12/1937 | Fed. Rep. of Germany | 111/3 |
| 849197 | 7/1952 | Fed. Rep. of Germany | 111/3 |
| 920157 | 10/1954 | Fed. Rep. of Germany | 111/3 |

*Primary Examiner*—James R. Feyrer
*Attorney, Agent, or Firm*—Harpman & Harpman

[57] ABSTRACT

A seedling planter for use for a self-propelled tiller or garden tractor comprises a transport trough for the seedlings with a row digger and seedling guide in spaced relation to the lower end of the trough, trailing ground engaging blades direct the ground around the set seedlings firmly positioning the same in the row.

5 Claims, 5 Drawing Figures

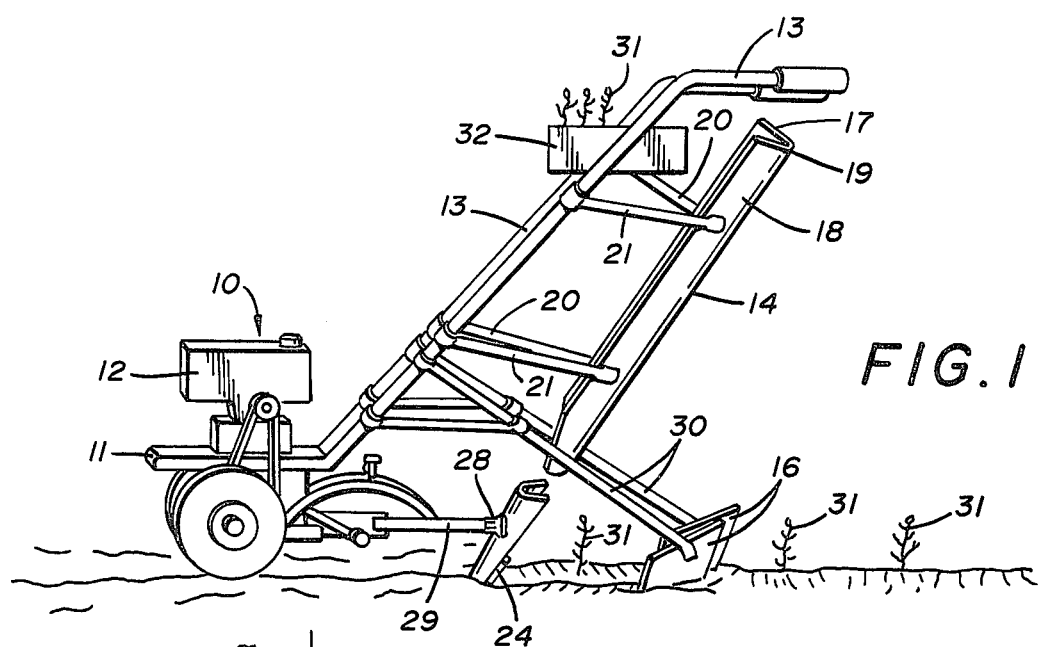
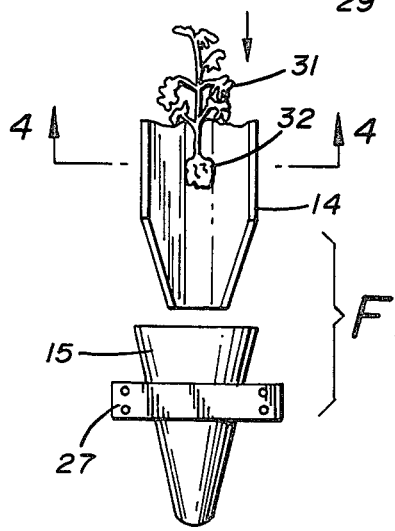
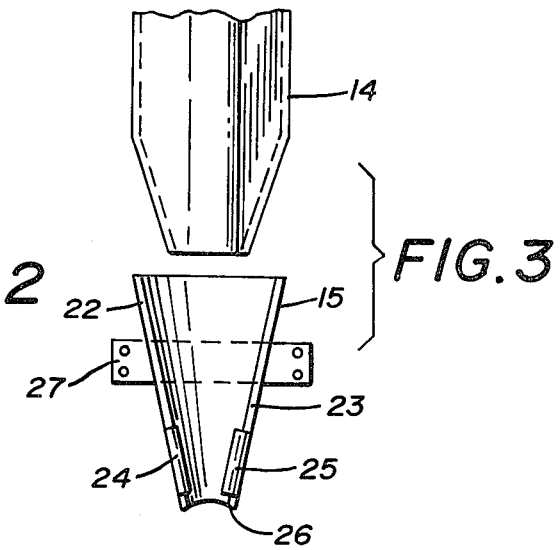
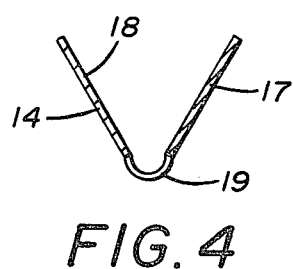
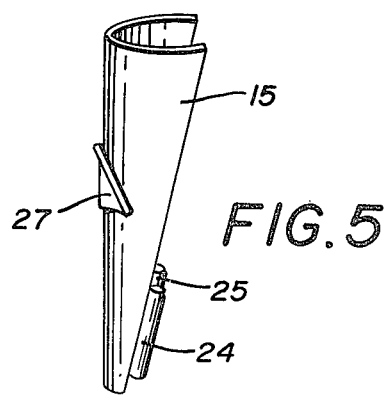

1

SEEDLING PLANTER

BACKGROUND OF THE INVENTION (1) Field of the Invention

This invention relates to digging and planting devices that set seedlings in a row.

(2) Description of the Prior Art

Prior art planters have used a variety of different ways to transplant and plant seedings. See for example U.S. Pat. Nos. 2,776,633; 3,998,171 and 4,060,043.

In U.S. Pat. No. 2,776,633 a plant setter is disclosed wherein a tube guides the seedlings into the ground.

In U.S. Pat. No. 3,998,171 a planting machine is shown with a depth indicator operated by pneumatic means.

U.S. Pat. No. 4,060,043 discloses a planting machine having a digging and transport telescopic tube with a movable end closure that can be closed when the tube digs and opened when a seedling is delivered therethrough.

In applicant's device a seedling transport trough is positioned adjacent a curved row digger. A pair of ground engaging blades move ground around the seedlings that have been delivered by the trough and positioned by the row digger.

SUMMARY OF THE INVENTION

A seedling planter for use with a self-propelled tractor or tiller provides an inclined guide trough spaced above a row digger. Seedings positioned in the trough slide downwardly and into a furrow created by the row digger. A pair of following ground engaging blades hill the ground up and around the seedlings.

DESCRIPTION OF THE DRAWINGS

FIG. 1 is a perspective view of the seedling planter.

FIG. 2 is an enlarged detail of portions of the device of FIG. 1;

FIG. 3 is a back view of the portions of the device shown in FIG. 2;

FIG. 4 is a horizontal section on line 4—4 of FIG. 2; and

FIG. 5 is a side perspective of one of the portions of the device of FIGS. 2 and 3.

DESCRIPTION OF THE PREFERRED EMBODIMENT

A seedling planter for use with a self-propelled tiller or tractor is illustrated in FIG. 1 of the drawings wherein a self-propelled tiller 10 having a frame 11 and engine 12 and a pair of spaced handles 13 supports and positions a planter which comprises a transport trough 14, a row digger 15 and a pair of blades 16. The transport trough 14 is generally V-shaped in cross section having oppositely disposed sides 17 and 18 joined by an arcuate portion 19 as best seen in FIGS. 1 and 4 of the drawings.

Several pairs of support arms 20 and 21 are secured at one of their ends to the sides 17 and 18 respectively adjacent the opposite ends of the trough 14. The other ends of the support arms 20 and 21 are respectively secured to the handles 13 as seen in FIG. 1 of the drawings. The row digger 15 as seen in FIGS. 2, 3 and 5 of the drawings has an elongated transversely arcuate shape with longitudinal edges 22 and 23. The row digger 15 tapers inwardly and downwardly along both of its longitudinal edges 22 and 23 with its upper end being greater in size than the adjacent lower end of the trough 14. Short cross sectionally round rods 24 and 25 are respectively secured to the longitudinal edges 22 and 23 of the row digger 15 adjacent the lower portion 26 as seen in FIG. 5 of the drawings. Each of the rods 24 and 25 are approximately one-quarter the overall length of the row digger 15. A rectangular mounting bracket 27 has a curved center section affixed to the row digger 15. The ends of the bracket 27 are apertured for the reception of fasteners 28 securing the row digger 15 to an arm 29 which extends rearwardly from the tiller 10.

A pair of secondary support arms 30 extend from the handles 13 to the blades 16 and are secured thereto.

In use the seedling planter moves along behind the tiller 10 with the row digger 15 and rods 24 and 25 engaging the ground forming a furrow. A seedling 31 is manually moved from a box 32 mounted between the handles 13 and placed in the transport trough 14 where it slides downwardly and into upright position in the furrow being formed by the row digger 15. The rods 24 and 25 curl the dirt around the edges of the row digger 15 and against the seedlings 31 temporarily supporting the seedlings in an upright position in the furrow. The spacing between the row digger 15 and the transport trough 14 is such that the seedlings 31 will be guided to the precise desired position relative the row digger 15.

The blades 16 trailing behind the row digger 15 are angled inwardly towards one another so as to hill the dirt around seedlings 31 as shown in FIG. 1 of the drawings securely planting the seedlings.

Referring now to FIGS. 2 and 4 of the drawings, it will be seen that the arcuate bottom section 19 of the transport trough 14 is shaped to accommodate the root ball 32 of the seedlings 31 moving therealong while at the same time the V-shaped sides 17 and 18 support the seedlings upper leaves and stems.

It will thus be seen that a new and useful planter has been illustrated and described and that various modifications may be made therein without departing from the spirit of the invention and having thus described my invention what I claim is:

1. The combination of a seedling planter attachment and a ground engaging tiller, said tiller having means for tilling the ground and rearwardly and upwardly extending handles by which said tiller is guided, said seedling planter attachment comprising an inclined transport trough and means on said handles of said tiller supporting said transport trough in spaced relative parallel relation thereto, a row digger positioned forwardly of the lower end of said transport trough and rearwardly of said tiller and means attaching said row digger to said tiller, said row digger being transversely arcuately shaped to form convex exterior and concave interior surfaces and positioned with said convex exterior towards said tiller, and a pair of blades positioned in spaced side by side relation to each other and located rearwardly of said row digger and attached to said handles, said row digger being arranged to form a furrow in the ground and guide the seedlings from said transport trough into said furrow and said blades arranged to hill the ground from the furrow around the seedlings.

2. The combination of claim 1 and wherein cross sectionally round members are attached to the longitudinal edges of the row digger and arranged to curl the ground of the furrow around the seedlings placed therein by said row digger.

3. The combination of claim 1 and wherein the means attaching the row digger to the tiller is a rigid arm so that the position of said tiller controls the engagement of the row digger in the ground.

4. The combination of claim 1 and wherein the means attaching said blades to said handles are rigid arms so that the position of the handles controls the position of the blades relative to the ground engaged thereby.

5. The combination of claim 1 and wherein said row digger is positioned at substantially the same angle as said handles and transport trough.

* * * * *